(12) United States Patent
Schwarze et al.

(10) Patent No.: US 11,685,122 B2
(45) Date of Patent: Jun. 27, 2023

(54) TECHNIQUE FOR ANALYZING SENSOR DATA IN POWDER BED ADDITIVE MANUFACTURING

(71) Applicant: SLM Solutions Group AG, Luebeck (DE)

(72) Inventors: Dieter Schwarze, Luebeck (DE); Kim Kulling, Luebeck (DE); Andreas Hoppe, Luebeck (DE); Baerbel Kratz, Luebeck (DE); Daniel Alberts, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 0 days.

(21) Appl. No.: 17/639,093

(22) PCT Filed: Aug. 25, 2020

(86) PCT No.: PCT/EP2020/073701
§ 371 (c)(1),
(2) Date: Feb. 28, 2022

(87) PCT Pub. No.: WO2021/058216
PCT Pub. Date: Apr. 1, 2021

(65) Prior Publication Data
US 2022/0194011 A1    Jun. 23, 2022

(30) Foreign Application Priority Data
Sep. 25, 2019   (DE) .................. 10 2019 125 822.7

(51) Int. Cl.
*B29C 64/393*    (2017.01)
*B33Y 10/00*    (2015.01)
(Continued)

(52) U.S. Cl.
CPC ............ *B29C 64/393* (2017.08); *B22F 10/28* (2021.01); *B22F 10/366* (2021.01);
(Continued)

(58) Field of Classification Search
CPC ..... B29C 64/393; B29C 64/153; B22F 10/28; B22F 10/366; B22F 10/368; B22F 12/90;
(Continued)

(56) References Cited

U.S. PATENT DOCUMENTS

2015/0026268 A1* 1/2015 Hui .................... H04L 51/18
                                                       709/206
2017/0266762 A1* 9/2017 Dave .................... B22F 10/366
(Continued)

FOREIGN PATENT DOCUMENTS

DE    102014216567    2/2016
DE    102015113700    10/2016
(Continued)

OTHER PUBLICATIONS

Clijsters etc. al., "In situ quality control of the selective laser melting process using a high-speed, real-time melt pool monitoring system", Int J Adv Manuf Technol (2014) 75:1089-1101 (Year: 2014).*
(Continued)

*Primary Examiner* — Thomas C Lee
*Assistant Examiner* — Michael Tang
(74) *Attorney, Agent, or Firm* — Williams Mullen; Thomas F. Bergert

(57) ABSTRACT

A device is provided, for analyzing sensor data of a sensor arranged in an apparatus for producing a three-dimensional work piece via irradiation of layers of raw material with an energy beam. Further, a corresponding method and a corresponding computer program product are provided.

14 Claims, 5 Drawing Sheets

(51) Int. Cl.
    *B33Y 50/02*     (2015.01)
    *B29C 64/153*    (2017.01)
    *B22F 12/90*     (2021.01)
    *B22F 10/28*     (2021.01)
    *B22F 10/368*    (2021.01)
    *B22F 10/366*    (2021.01)

(52) U.S. Cl.
    CPC ............ *B22F 10/368* (2021.01); *B22F 12/90* (2021.01); *B29C 64/153* (2017.08); *B33Y 10/00* (2014.12); *B33Y 50/02* (2014.12)

(58) Field of Classification Search
    CPC ...... B22F 2999/00; B22F 10/36; B33Y 10/00; B33Y 50/02; Y02P 10/25
    USPC ............................................ 700/118, 109, 98
    See application file for complete search history.

(56)                References Cited

U.S. PATENT DOCUMENTS

2019/0255654  A1*   8/2019  Beckett ................. B29C 64/153
    2020/0360733  A1*  11/2020  Yan ..................... G01R 33/5659
    2022/0168813  A1*   6/2022  Dardis .................. B29C 64/153

FOREIGN PATENT DOCUMENTS

| DE | 102017217761 | 4/2019 | | |
| EP | 2598313 | 6/2013 | | |
| EP | 2878402 | 6/2015 | | |
| EP | 2961549 | 1/2016 | | |
| JP | 2016-502603 | 1/2016 | | |
| WO | 2017085468 | 5/2017 | | |
| WO | 2017085469 | 5/2017 | | |
| WO | WO-2017085468 A1 * | 5/2017 | .............. | B22F 10/00 |
| WO | 2018064066 | 4/2018 | | |

OTHER PUBLICATIONS

International Search Report and Written Opinion for PCT/EP2020/073701, European Patent Office, dated Nov. 16, 2020.
Search Report for German Application No. 10 2019 125 822.7, German Patent and Trademark Office, dated May 22, 2020.
Japan Patent Office, Japanese Office Action for JP Patent Application No. 2022-518943, dated Aug. 18, 2020.

* cited by examiner

TECHNIQUE FOR ANALYZING SENSOR DATA IN POWDER BED ADDITIVE MANUFACTURING

CROSS-REFERENCES TO RELATED APPLICATIONS

This application is based on international patent application PCT/EP 2020/073701 and claims the benefit of the German patent application No. 10 2019 125 822.7 filed on Sep. 25, 2019, the entire disclosures of which are incorporated herein by way of reference.

FIELD OF THE INVENTION

The present invention relates to a technique for analyzing sensor data of a sensor arranged in an apparatus for producing a three-dimensional work piece via irradiation of layers of raw material with an energy beam. The technique may be embodied in at least one of a device, a method, and a computer program product. The apparatus for producing the three-dimensional work piece may be an apparatus for selective laser melting or selective laser sintering.

BACKGROUND OF THE INVENTION

Powder bed fusion is an additive layering process by which pulverulent, in particular metallic and/or ceramic raw materials can be processed to three-dimensional work pieces of complex shapes. To that end, a raw material powder layer is applied onto a carrier and subjected to radiation (e.g., laser or particle radiation) in a site-selective manner in dependence on the desired geometry of the work piece that is to be produced. The radiation penetrating into the powder layer causes heating and consequently melting or sintering of the raw material powder particles. Further raw material powder layers are then applied successively to the layer on the carrier that has already been subjected to radiation treatment, until the work piece has the desired shape and size. Powder bed fusion may be employed for the production of prototypes, tools, replacement parts, high value components or medical prostheses, such as, for example, dental or orthopedic prostheses, on the basis of CAD data. Examples for powder bed fusion techniques include selective laser melting and selective laser sintering.

Apparatuses are known for producing one or more work pieces according to the above technique. For example, EP 2 961 549 A1 and EP 2 878 402 A1, respectively, describe an apparatus for producing a three-dimensional work piece according to the technique of selective laser melting. The general principles described in these documents may also apply to the technique of the present disclosure. However, the present disclosure is not limited to selective laser melting and may be applied to other additive manufacturing processes, according to which layers of raw material are solidified by means of a radiation beam.

It is further known to monitor the properties of a build process by providing at least one sensor that constantly measures a particular property (such as a physical condition) during the build process. For example, sensors may be provided for measuring a temperature within a build chamber of the apparatus, an oxygen content within the build chamber, an inert gas pressure, and/or a melt pool temperature, i.e., a temperature of a melt pool caused by the radiation beam, where the radiation beam impinges on the raw material. In particular, it is known to provide a so-called melt pool monitoring system comprising a sensor in the form of a pyrometer, which measures an intensity of thermal radiation generated in the melt pool. More precisely, the pyrometer receives thermal radiation emitted from the melt pool and is configured to measure at least one intensity value of the thermal radiation. Based on the measured intensity value, the pyrometer (or a control unit connected to the pyrometer) can determine a temperature of the melt pool.

The data values resulting from the measurement of the corresponding sensor can be stored in a memory of a control unit of the apparatus and it is known, e.g., to generate a two-dimensional map of these data values representing a layer of the generated work piece. Based on this two-dimensional map, e.g., areas can be identified in which the sensor data significantly differs from the other areas of the layer. This may be an indication that in the identified areas, a quality of the work piece is different from the other areas.

However, by performing this form of data evaluation, valuable information gets lost and cannot be considered in the data evaluation. In particular, it is not possible to allocate the individual data points to a particular scanning vector of the generated work piece. Another disadvantage of the known form of data evaluation is that, when the data is evaluated, the irradiation of the entire layer is already carried out and there is no possibility of monitoring the irradiation online and to adjust parameters of the irradiation or to stop the irradiation process based on the evaluation during the irradiation of a layer.

SUMMARY OF THE INVENTION

The invention is therefore directed at the object of providing a device and a method, which solve the above-described problems and/or other related problems. In particular, it is an object of the present invention to provide an improved technique for analyzing sensor data of a sensor.

According to a first aspect, a device is provided, for analyzing sensor data of a sensor arranged in an apparatus for producing a three-dimensional work piece via irradiation of layers of raw material with an energy beam. The device comprises a control unit configured to receive the sensor data as a time series of data values. Each data value is indicative of a process condition within the apparatus during producing the three-dimensional work piece. The control unit is further configured to receive planning data for the three-dimensional work piece. The planning data defines a plurality of scanning vectors and a sequence according to which the energy beam is scanned along the scanning vectors. The control unit is further configured to associate data values of the time series to corresponding vector data of the scanning vectors of the planning data to form a plurality of sets of data values for corresponding scanning vectors and to define, based on the planning data, a group of at least two scanning vectors among the plurality of scanning vectors. The scanning vectors of the group meet a predefined similarity criterion. The control unit is further configured to compare the set of data values of a first scanning vector of the group to the set of data values of at least one second scanning vector of the group or to a combined set of data values derived from at least two second scanning vectors of the group, and to determine, based on the comparing, a quality measure of the work piece at a position of the first scanning vector.

The device may be, e.g., a stand-alone device configured to receive the sensor data from an apparatus for producing a three-dimensional work piece or it may be part of a control unit of an apparatus for producing a three-dimensional work piece. The time series of data values may be provided, e.g., as a data stream or in the form of a data file. A timestamp may be assigned to one or more of the data values, such that a particular point in time can be assigned to each of the data values (e.g., when a sampling frequency of the sensor is known). For example, the timestamp may indicate a point in time when a build process of the work piece has started. The data values may be the result of a sampling of the corresponding sensor with a constant sampling rate, such that intervals between the individual data values are known and constant. The process condition may be a physical process condition and may be measured, e.g., within a process chamber of the apparatus for producing a three-dimensional work piece. Examples of process conditions that may be measured are, amongst others, a temperature within the build chamber, an oxygen content within the build chamber, an inert gas pressure, and/or a melt pool temperature.

The planning data may be provided in the form of a data file. The planning data may be the result of a process, according to which a CAD file of a work piece is analyzed and wherein the work piece to be generated is subdivided into a plurality of layers and each of the layers is subdivided into a plurality of scanning vectors. A scanning vector, in general, may be defined as a route scanned by a radiation beam of the apparatus between a point where the radiation beam starts to generate a melt pool and a point where the radiation beam stops to generate a melt pool. Thus, according to this definition of a scanning vector, the scanning vectors may be curved and may change their direction. According to a stricter definition of a scanning vector, which may also apply to the teaching disclosed herein, a scanning vector is defined as a section of a route scanned by the radiation beam, wherein the section forms a straight line. In this context, it is possible, e.g., to irradiate a layer of a work piece to be generated with a hatch pattern comprising a plurality of parallel scanning vectors. Each scanning vector has a particular predefined length, wherein the plurality of scanning vectors each having a same length may be provided, but also scanning vectors having different lengths. For example, an inner region of a work piece may be filled with a checkerboard pattern, wherein each field of the pattern is filled with a plurality of parallel scanning vectors and the scanning vectors of the different fields are directed into different directions.

As mentioned above, the planning data defines a plurality of scanning vectors and a sequence according to which the energy beam is scanned along the scanning vectors. The planning data may further define additional information and/or data regarding the build process. For example, the planning data may comprise one or more of the planned scanning vectors per layer, a positioning of the work piece(s), a scanning velocity (e.g., of the individual scanning vectors), a laser power (e.g., for the individual scanning vectors), a focus size (e.g., for the individual scanning vectors), a scanning direction of the individual scanning vectors, and a scanning sequence of the individual scanning vectors.

Each of the sets of data values corresponds to a particular scanning vector. For example, each of the data sets may be provided in the form of an n-dimensional vector, wherein n is a number of sensor values measured during the irradiation of the corresponding scanning vector. When the sampling rate of the sensor is known, the time for scanning the scanning vector can be calculated. Further, when the scanning speed is known (e.g., from the planning data), for each sensor value (i.e., for each data point of the data sets), a corresponding position with regard to the layer of the work piece can be calculated.

The group of at least two scanning vectors is defined based on the planning data and such that the scanning vectors within the group meet a particular similarity criterion. In other words, the scanning vectors of the group are similar with regard to at least one criterion. More precisely, for each of the scanning vectors of the planning data, respective similarity values may be calculated with regard to each of the remaining scanning vectors. For example, if the number of scanning vectors is n, for each of the n scanning vectors, n−1 similarity values may be calculated. Pairs of scanning vectors, for which the similarity value is below a predefined threshold value, can be grouped into the same group.

In addition to the group of at least two scanning vectors, one or more additional group(s) may be defined. The vectors of the one or more additional group(s) respectively meet other predefined similarity criteria than the vectors of the (first) group.

In the step of comparing, the set of data values of a first scanning vector of the group can be compared to the set(s) of data values of one or more second scanning vectors of the same group. Alternatively, the set of data values of the first scanning vector is compared to a combined set of data values derived from at least two second scanning vectors of the same group. The first scanning vector of the group may be the "youngest" scanning vector of the group, i.e., a scanning vector that was most recently irradiated. The set of data values of the first scanning vector may be compared to only one other scanning vector (e.g., a previously irradiated scanning vector) and a result of this comparison may be compared to previous results of comparisons of data sets of scanning vectors within the same group (i.e. within the group of the first scanning vector). Should the results of the comparison of the set of data values of the first scanning vector with the set of data values of the other scanning vector strongly differ from previous comparison results (i.e., be above a predefined threshold value), then it can be determined that a quality of the work piece at the position of the first scanning vector has changed. In other words, there is an increased probability that, at a respective position of the work piece, its quality has changed with regard to other sections of the work piece.

In a similar way, the set of data values of the first scanning vector is not only compared to the set of data values of one second scanning vector but with sets of data values of a plurality of second scanning vectors, e.g., with each of the remaining (second) scanning vectors of the group. Alternatively, a combined set of data values may be derived from at least two of the second (remaining) scanning vectors, wherein the comparison of the set of data values of the first scanning vector is compared to the combined set. For example, the combined set of data values may be an averaged set of data values. More precisely, a form of averaging may have been applied to the sets of data values of the at least two of the second scanning vectors of the group in order to derive an averaged set of data values. The averaging may include deriving an arithmetic mean of the data values of the different vectors. The combined set of data values may have been derived by considering at least one of a meridian, extreme values and quantiles.

Based on the above-described comparing, a quality measure of the work piece at a position of the first scanning vector is determined. For example, in case the comparison leads to a high degree of difference, it may be determined that a quality of the work piece at the position of the first scanning vector is likely to be lower than a quality of the remaining sections of the work piece.

By implementing the above technique, sensor data of similar scanning vectors can be compared to each other. Hence, it may be possible to identify "unusual" or "problematic" data values by comparing them to data values of similar scanning vectors, wherein it can be assumed that the data values of the scanning vectors within the group should not differ too much with regard to each other. In some cases, a comparison with a reference value or a reference set of data values may be avoided. More precisely, a comparison with a so-called "ground truth" is not necessary. However, in addition to the group-wise comparison disclosed herein, a comparison with a reference value may be carried out in order to obtain additional information and/or validation.

The data values may be intensity values or temperature values of thermal radiation generated in a melt pool where the energy beam impinges on the raw material.

In other words, the data values may be intensity values of thermal radiation generated in a melt pool where the energy beam impinges on the raw material or the data values may be temperature values of thermal radiation generated in a melt pool where the energy beam impinges on the raw material. In both cases, the sensor may be a pyrometer. The pyrometer may be configured to detect a thermal radiation intensity in one or more wavelength bands. The one or more thermal radiation intensity may then be output as an intensity value or a corresponding temperature value may be calculated based on the one or more thermal radiation intensity. Hence, the data values may be either the (direct) intensity values or the data values may be temperature values derived from one or more thermal radiation intensity values. Since thermal radiation intensity emitted from a melt pool may quickly vary, a sampling frequency of the sensor may be high enough that a plurality of data values is recorded during the course of one scanning vector.

The device may be configured to carry out at least the steps of receiving the sensor data, associating, comparing, and determining during a build process of the work piece.

For example, the sensor data may be continuously measured during the build process, such that new data values are generated during the process. In order to deal with these newly generated sensor data, the aforementioned steps can be carried out during the build process of the work piece. Hence, the sensor data may be analyzed almost in real time, i.e., at the time it is generated. Hence, it is possible to quickly react to deviations, e.g., by adapting parameters of the build process according to a closed loop control.

The control unit may further be configured to adapt, during the build process, a process parameter of the apparatus, based on the determined quality measure.

The process parameter may be, e.g., a laser power, a laser focus position, a scanning speed, etc. in this way, counter measures may be initiated which help to counter a decreasing quality of the work piece.

The control unit may further be configured to associate time data with the data values of the time series.

The time data may comprise at least one timestamp that is associated with a corresponding data value of the time series. In case a sampling frequency of the sensor is known, it may be sufficient to only associate one time data point with a corresponding data value of the sensor. Thus, a corresponding point in time can be assigned to each of the data values. The time data may indicate a time of day and, optionally, a date. Additionally or alternatively, the time data may indicate a time relative to a predefined reference time t=0 (such as a start of the build process). Based on the time data, for each of the data values, a corresponding position within the work piece may be identified.

The similarity criterion may consider at least one of a similarity in length of the scanning vectors, a similarity in orientation of the scanning vectors, and whether a scanning vector is part of a contour of the work piece.

In other words, scanning vectors having a similar length may be grouped into one group. Thus, for a plurality of different length intervals, a corresponding group may be provided. Similarly, scanning vectors having a similar orientation may be grouped into one group. Scanning vectors that are part of a contour of a work piece may be grouped into a group.

The control unit may further be configured to compare the set of data values of the first scanning vector of the group to a predefined reference set of data values associated to the group.

The reference set of data values may be stored in a memory of the control unit or may be calculated ad hoc. The reference set may have been previously calculated or predefined with regard to properties of the respective group. For example, in case it is known that scanning vectors having a particular length (or being in a particular range of lengths) should exhibit a particular typical reaction with regard to the measured sensor values, the reference set may comprise these typical values. Further, the reference set may be derived from at least one previous measurement, i.e., a measurement during an earlier build process carried out with the same apparatus. In this case, e.g., the reference set may be a set of average data values of a corresponding group of scanning vectors fulfilling the same similarity criterion.

The control unit may be configured to compare the set of data values of the first scanning vector of the group to the set of data values of a previously irradiated second scanning vector of the group, and determine, based on the comparing, at least one difference value indicative of a difference between the sets of data values of the first scanning vector and the second scanning vector.

The difference value may be a distance metric of the compared set of data values. In the above-described way, the data values of the vectors may be compared one after the other. In other words, every time a new scanning vector has been irradiated and corresponding data values have been recorded, these data values are compared to those of a previous scanning vector out of the same group. A result of this comparison may then be compared, e.g., to a threshold value. In case the difference value exceeds a predefined threshold, it may be judged that the new scanning vector (first scanning vector) comprises unusual data values which may lead to a deviation in the work piece quality.

The control unit may further be configured to compare the at least one difference value to a stored difference value indicative of a difference between the sets of data values of two previously irradiated scanning vectors.

Thus, a typical degree of difference between the individual vectors may be considered and only if the difference value of the first scanning vector exceeds this typical degree, it may be judged that the first scanning vector comprises unusual data values.

The control unit may be configured to perform the step of comparing by considering at least one of: a course of absolute data values, such as decrease and/or increase of the data values from scanning vector to scanning vector, a relative comparison of data values, such as differences, deviations, and/or fluctuations with regard to each other, correlations of the set of data values of the first scanning vector and the set of data values of the at least one second scanning vector or the combined set of data values derived from the at least two second scanning vectors, absolute differences between data values of the first scanning vector and data values of the at least one second scanning vector or the combined set of data values derived from the at least two second scanning vectors, and an extreme value analysis of extreme values of the set of data values of the first scanning vector and of the set of data values of the at least one second scanning vector or of the combined set of data values derived from the at least two second scanning vectors.

The control unit may be configured to perform the step of comparing by considering only a subset of the set of data values of the first scanning vector and/or of the at least one second scanning vector or of the combined set of data values derived from the at least two second scanning vectors.

For example, the subset of the set of data values of the first scanning vector may begin and a predefined time t0 after the recording of data values for the respective vector. For example, considering only a subset of the set of data values may have the advantage that subsets having the same length may be compared to each other. For example, when a group of scanning vectors comprises vectors with different lengths and, thus, different amounts of data values, each of the vectors may be cropped to a predefined uniform length, such that the vectors can be easily compared to each other. Further, by only considering a subset, sections of the corresponding vector may be disregarded, which obviously comprise data values that are deviant (e.g., turning points of the vector, vectors ending at an edge of the raw material, etc.).

The control unit may be configured to output a data set that represents at least one two-dimensional image of a layer of the work piece, wherein the data values of the time series are assigned to corresponding pixels of the two-dimensional image.

In this way, the measurements of the sensor can be individually analyzed.

According to a second aspect, an apparatus for producing a three-dimensional work piece via irradiation of layers of raw material with an energy beam is provided. The apparatus comprises the device of the first aspect, an energy beam source for producing the energy beam and irradiating the energy beam onto the layers of raw material, and a sensor configured to measure the time series of data values and to transmit the time series of data values to the device.

The energy beam may be, e.g., a laser or an electron beam. The layers of raw material may be layers of raw material powder (such as a metal powder or a ceramic powder). Since the device of the first aspect is part of the apparatus of the second aspect, the above-discuss details of the first aspect may also apply to the second aspect.

According to a third aspect, a method is provided, for analyzing sensor data of a sensor arranged in an apparatus for producing a three-dimensional work piece via irradiation of layers of raw material with an energy beam. The method comprises receiving the sensor data as a time series of data values. Each data value is indicative of a process condition within the apparatus during producing the three-dimensional work piece. The method further comprises receiving planning data for the three-dimensional work piece. The planning data defines a plurality of scanning vectors and a sequence according to which the energy beam is scanned along the scanning vectors. The method further comprises associating data values of the time series to corresponding vector data of the scanning vectors of the planning data to form a plurality of sets of data values for corresponding scanning vectors, and defining, based on the planning data, a group of at least two scanning vectors among the plurality of scanning vectors. The scanning vectors of the group meet a predefined similarity criterion. The method further comprises comparing the set of data values of a first scanning vector of the group with the set of data values of at least one second scanning vector of the group or to a combined set of data values derived from at least two second scanning vectors of the group and determining, based on the comparing, a quality measure of the work piece at a position of the first scanning vector.

The method of the third aspect may be carried out with the device of the first aspect. The details and further specifications discussed above with regard to the first aspect may also apply to the method of third aspect.

According to a fourth aspect, a computer program product stored on a computer-readable storage medium is provided. The computer program product comprises computer-readable instructions for causing a computer to carry out the method according to the third aspect.

The details and further specifications discussed above with regard to the device of the first aspect may also apply to the computer program product of the fourth aspect.

Preferred embodiments of the invention are described in greater detail with reference to the appended schematic drawings.

DETAILED DESCRIPTION OF PREFERRED EMBODIMENTS

Figure 1:
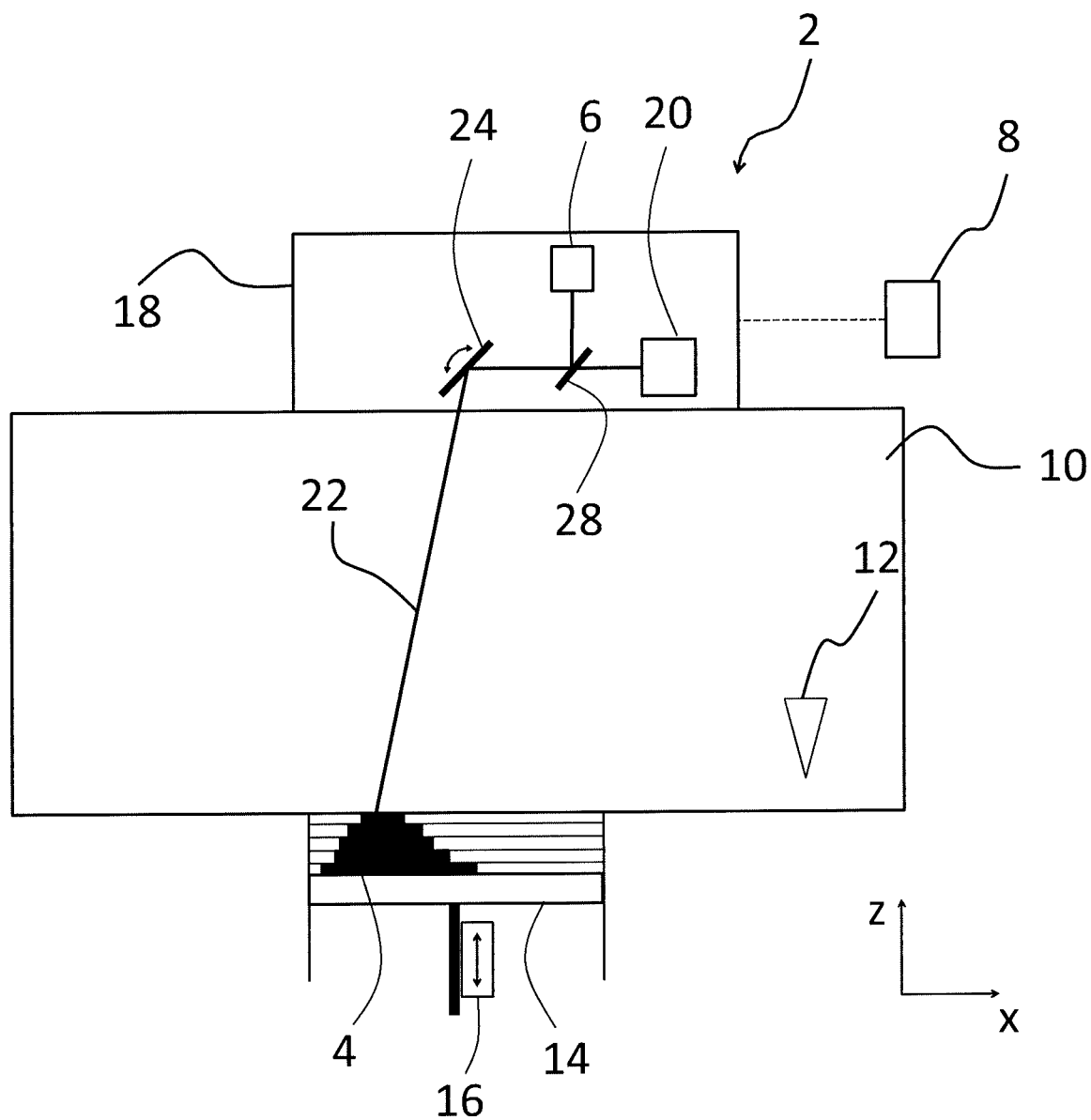
FIG. 1 shows a schematic representation of an apparatus for producing a three-dimensional work piece via irradiation of layers of raw material with an energy beam, the apparatus comprising a sensor and a device for analyzing sensor data of the sensor, according to the present disclosure.

FIG. 1 shows a schematic representation of an apparatus 2 for producing a three-dimensional work piece 4. The apparatus 2 comprises a sensor 6 in the form of a sensor for measuring thermal radiation and a device for analyzing sensor data generated by the sensor 6. The device comprises a control unit 8, which is—in the embodiment of FIG. 1—a general control unit 8 of the apparatus 2.

The apparatus 2 shown in FIG. 1 is an apparatus for producing a three-dimensional work piece 4 by selective laser melting. The apparatus 2 comprises a process chamber 10. The process chamber 10 is sealable against the ambient atmosphere, i.e. against the environment surrounding the process chamber 10. A powder application device 12, which is disposed in the process chamber 10, serves to apply a raw material powder onto a carrier 14. A vertical movement unit 16 is provided, such that the carrier 14 can be displaced in a vertical direction so that, with increasing construction height of the work piece 4, as it is built up in layers from the raw material powder on the carrier 14, the carrier 14 can be moved downwards in the vertical direction.

Since the movability of the carrier 14 by means of the vertical movement unit 16 is well-known in the field of selective laser melting, it will not be explained in detail herein. As an alternative to the movable carrier 14, the carrier 14 may be provided as stationary (or fixed) carrier (in particular, with regard to the vertical z-direction), wherein the irradiation unit 18 (see below) and the process chamber 10 are configured to be moved upwards during a build process (i.e., with increasing construction height of the work piece 4).

A carrier surface of the carrier 14 defines a horizontal plane (an x-y-plane), wherein a direction perpendicular to said plane is defined as a vertical direction (z-direction).

Hence, each uppermost layer of raw material powder extends in a plane parallel to the horizontal plane (x-y-plane) defined above.

The apparatus 2 further comprises an irradiation unit 18 for selectively irradiating laser radiation onto an uppermost layer of raw material powder applied onto the carrier 14. By means of the irradiation unit 18, the raw material powder applied onto the carrier 14 may be subjected to laser radiation in a site-selective manner in dependence on the desired geometry of the work piece 4 that is to be produced.

The irradiation unit 18 comprises at least one laser beam source 20 for generating a laser beam 22. In alternative embodiments, a particle beam (e.g., an electron beam) may be used for melting the raw material powder, instead of the laser beam 22. The laser beam source 20 may, for example, comprise a diode pumped Ytterbium fibre laser emitting laser light at a wavelength of approximately 1070 to 1080 nm. The irradiation unit 18 comprises a scanning unit 24 for directing the laser beam 22 onto the uppermost layer of raw material powder applied onto the carrier 14 in order to locally heat and melt the powder at desired locations, i.e., in a site-selective manner. By means of the scanning unit 24, the position of the laser beam 22 can be moved over the x-y-plane of the uppermost layer of raw material powder. The scanning unit 24 may comprise one or more movable mirrors and may be configured in the form of a galvanometer scanner.

Further, the irradiation unit 18 may comprise, in addition to the scanning unit 24 other optical components such as a beam expander for expanding the laser beam 22, a focusing optic for focusing the laser beam 22 in a direction along the beam path, and/or an object lens. The object lens may be an f-theta object lens provided in the beam path after the scanning unit 24. The operation of the irradiation unit 18 is controlled by means of a control unit 8. Further, the control unit 8 is configured to control other components of the apparatus 2, such as the vertical movement unit 16 and the powder application device 12.

Further, the sensor 6 is arranged in the irradiation unit 18. The sensor 6 of the present embodiment is a pyrometer configured to detect thermal radiation emitted by a melt pool that is generated by the laser beam 22, where it impinges on the raw material powder and causes melting of the powder. A semi-transparent mirror 28 is provided for directing the thermal radiation to the sensor 6. The semi-transparent mirror 28 may be wavelength-dependent, such that preferably thermal radiation (light in a wavelength region of thermal radiation) is reflected towards the sensor 6.

More precisely, the semi-transparent mirror 28 is configured such that the laser beam 22 can pass the mirror 28 towards the scanning unit 24 and such that thermal radiation directed in the opposite direction is reflected towards the sensor 6. In this way, the laser beam 22 and the thermal radiation share the same beam path (between the raw material powder and the semi-transparent mirror 28).

However, it is not necessary that the sensor 6 is arranged in the same irradiation device 18 as the laser beam source 20. The sensor 6 may be provided as a separate device having a separate beam path and separate optical components (such as a scanning unit). Within the present disclosure, the thermal radiation emitted by the melt pool is considered a process condition within the apparatus 2. In addition or as an alternative to the sensor 6 for detecting thermal radiation, different sensors for detecting different process conditions within the apparatus 2 may be provided, such as a temperature sensor for detecting a temperature within the build chamber 10, a laser power sensor for detecting a laser power of the laser beam 22, and/or an inert gas pressure sensor for detecting an inert gas pressure, etc.

The sensor 6 detects the thermal radiation and outputs a sensor signal. The sensor signal, according to the present embodiment, is an analog signal that is sampled with a predefined known sampling rate and converted to a digital signal. The sampling can be done either by the sensor 6 itself or by the control unit 8. In either case, sensor data is obtained, that comprises a time series of data values that can be processed by the control unit 8. According to the present embodiment, the individual data values indicate an intensity of thermal radiation detected by the sensor 6. However, it is also possible that the sensor 6 or the control unit 8 receives an intensity signal generated by the sensor 6 and generates, based on the intensity signal, temperature data comprising data values that indicate a temperature of the melt pool.

It is possible that the individual data values represent absolute values of a calibrated sensor 6. However, since the data values are compared in relation to each other, it is not necessary that calibrated values are used.

Figure 2:
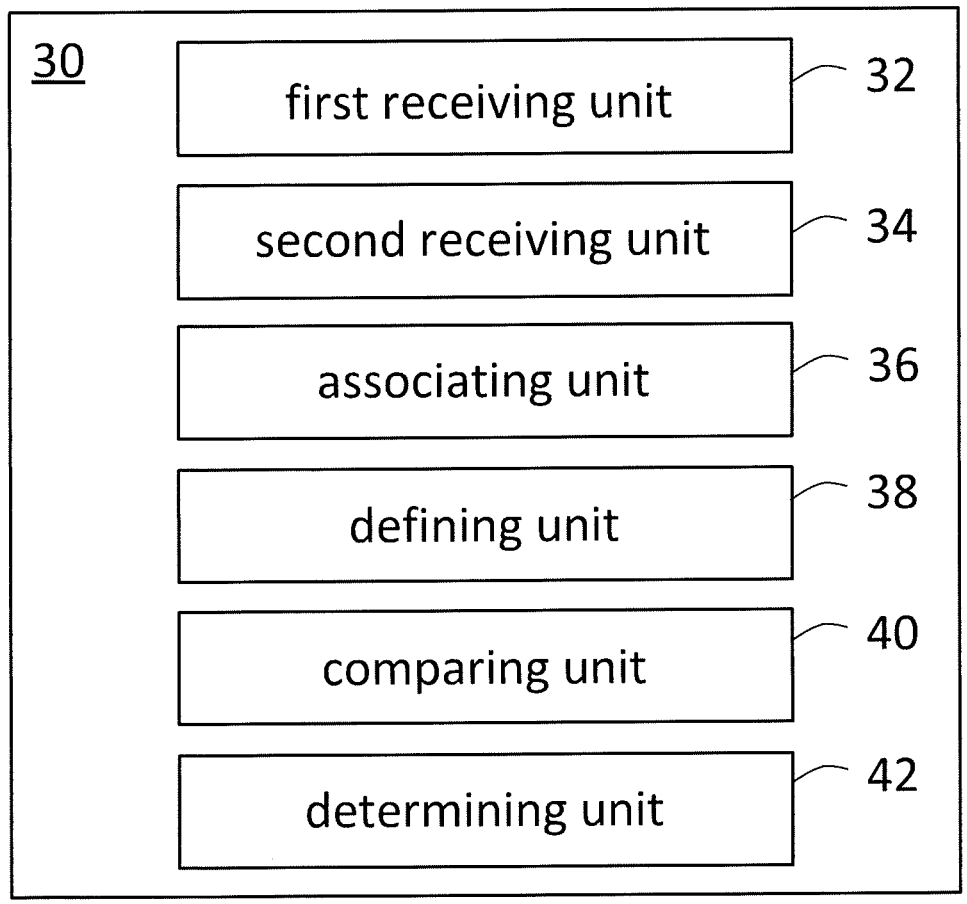
FIG. 2 shows a schematic block diagram of a device for analyzing sensor data of a sensor arranged in an apparatus for producing a three-dimensional work piece via irradiation of layers of raw material with an energy beam, according to the present disclosure.

FIG. 2 shows a schematic block diagram of a device 30 for analyzing sensor data of a sensor arranged in an apparatus for producing a three-dimensional work piece via irradiation of layers of raw material with an energy beam, according to the present disclosure. The control unit 8 shown in FIG. 1 is an embodiment of the device 30 shown in FIG. 2. Accordingly, the apparatus for producing a three-dimensional work piece is the apparatus 2 for producing the three-dimensional work piece 4 shown in FIG. 1 and the energy beam is the laser beam 22.

The device 30 of FIG. 2 comprises a plurality of units 32 to 42, wherein each of the units may be embodied in the form of hardware or software or a combination thereof. For example, the device 30 may comprise a processor and a memory, wherein the memory comprises instructions that represent the respective units 32 to 42.

The device 30 comprises a first receiving unit 32 configured to receive the sensor data as a time series of data values, wherein each data value is indicative of a process condition within the apparatus during producing the three-dimensional work piece. The device 30 comprises a second receiving unit 34 configured to receive planning data for the three-dimensional work piece, the planning data defining a plurality of scanning vectors and a sequence according to which the energy beam is scanned along the scanning vectors. The device 30 comprises an associating unit 36 configured to associate data values of the time series to corresponding vector data of the scanning vectors of the planning data to form a plurality of sets of data values for corresponding scanning vectors. The device 30 comprises a defining unit 38 configured to define, based on the planning data, a group of at least two scanning vectors among the plurality of scanning vectors, wherein the scanning vectors of the group meet a predefined similarity criterion. The device 30 comprises a comparing unit 40 configured to compare the set of data values of a first scanning vector of the group to the set of data values of at least one second scanning vector of the group or to a combined set of data values derived from at least two second scanning vectors of the group. The device 30 comprises a determining unit 42 configured to determine, based on the comparing, a quality measure of the work piece at a position of the first scanning vector.

The above-described units of the device 30 are configured to carry out a method comprising the following steps:

receiving the sensor data as a time series of data values, wherein each data value is indicative of a process condition within the apparatus during producing the three-dimensional work piece;

receiving planning data for the three-dimensional work piece, the planning data defining a plurality of scanning vectors and a sequence according to which the energy beam is scanned along the scanning vectors;

associating data values of the time series to corresponding vector data of the scanning vectors of the planning data to form a plurality of sets of data values for corresponding scanning vectors;

defining, based on the planning data, a group of at least two scanning vectors among the plurality of scanning vectors, wherein the scanning vectors of the group meet a predefined similarity criterion;

comparing the set of data values of a first scanning vector of the group with the set of data values of at least one second scanning vector of the group or to a combined set of data values derived from at least two second scanning vectors of the group; and determining, based on the comparing, a quality measure of the work piece at a position of the first scanning vector.

In the following, the individual units of the device 30 shown in FIG. 2 are described in detail in the context of the embodiment of FIG. 1, wherein the control unit 8 represents the device 30.

The first receiving unit 32 of the device 30 receives the sensor data as a time series of data values, wherein the data values are indicative of an intensity of thermal radiation emitted by the melt pool. Since the sensor 6 is sampled with a known sampling frequency, timing information can be associated with each of the data values. In other words, when a time is known at which, e.g., the first data value is recorded, a time of the other data values can be calculated. Accordingly, a respective timestamp can be assigned to one or more of the data values. It is further possible to derive particular events from the data values and thereby obtain information regarding the time these values were recorded (e.g., switching on the laser, switching of the laser, etc.).

The second receiving unit 34 of the device 30 receives the planning data. The planning data may be stored in a memory of the control unit 8 and may be used by the control unit 8 in order to obtain control data for the individual components of the apparatus 2. In other words, the planning data comprises all information regarding one particular build process (i.e., the build process of the respective work piece to be generated), such that the apparatus 2 can perform irradiation of the desired locations of the respective layers of raw material powder. For this purpose, the planning data comprises data defining a plurality of scanning vectors and a sequence according to which the laser beam 22 is scanned along the scanning vectors. In the example described below with reference to FIG. 3, the scanning vectors are a plurality of straight lines having a predefined length and being arranged parallel to each other in order to fill an inner part of the work piece 4. In addition to that, scanning vectors are provided that represent a contour of the work piece 4.

Since a timing of the measured sensor data is known (see above), the individual data values of the time series can be associated (by the associating unit 36) to corresponding vector data of scanning vectors of the planning data. As a result, a plurality of sets of data values is generated, wherein a set of data values corresponds to one of the scanning vectors. The sets of data values are stored in association with information that links the corresponding set of data values to a corresponding scanning vector.

The defining unit 38 defines a group of at least two scanning vectors among the plurality of scanning vectors that meet a predefined similarity criterion. This step is carried out based on the planning data without considering the corresponding sensor data. Therefore, this step can also be carried out at an earlier point in time, i.e., before the sensor data is received. In general, the order of method steps is not limited to the order indicated above and the method can be carried out according to an arbitrary order as long as it is technically possible.

The similarity criterion may be any criterion that is suitable for defining a similarity among scanning vectors. For example, scanning vectors having a particular length (or having a length in a particular range of lengths) may be grouped by the defining unit into one group and scanning vectors having a different length (or having a length in a particular, different, range of lengths) may be grouped into a different group. According to a different example, all scanning vectors having a particular orientation are grouped into one group. Accordingly, all scanning vectors pointing to the right (i.e., having a positive or zero x-component with regard to an arbitrarily chosen x-axis) are grouped into a first group and the remaining scanning vectors pointing to the left (i.e., having a negative x-component) are grouped into a second group. Further criteria for defining a similarity may be based on, e.g., a position of the scanning vector with regard to the work piece 4 (e.g., is the scanning vector part of a contour, part of an inner region, part of an upper/lower/left/right region of the work piece?).

The comparing unit 40 compares the set of data values of a first scanning vector of the group to the set of data values of at least one second scanning vector of the group. As an alternative, the set of data values of the first scanning vector is compared to a combined set of data values derived from at least two second scanning vectors of the group. When the present disclosure states that scanning vectors are compared to each other it should be acknowledged that the above step of comparing is meant, i.e., that the corresponding sets of data values of the respective vectors are compared to each other.

According to one embodiment, each newly measured scanning vector is compared to the previously recorded scanning vector of the same group. As mentioned above, this means that the corresponding sets of data values of the scanning vectors are compared to each other. For example, a type of distance metric may be calculated for the respective two vectors. The distance metric may be any distance metric suitable for identifying data values that might indicate a varying quality of the work piece at the location of the respective scanning vector.

Examples for the step of comparing and determining the distance metric are:

determine a difference of a maximum value of the set of data values of the first vector and a maximum value of the set of data values of the second vector;

determine a difference of a minimum value of the set of data values of the first vector and a minimum value of the set of data values of the second vector;

determine a difference of an average value of the set of data values of the first vector and an average value of the set of data values of the second vector;

determine a difference of a median value of the set of data values of the first vector and a median value of the set of data values of the second vector; or determine a sum of absolute differences of the individual data values of the two sets.

The comparing unit 40 subsequently judges whether the distance metric exceeds a threshold or not. The threshold may be a predefined (fixed) threshold value. The threshold may further be derived based on previously measured distance metrics of the same group. For example, the threshold is an average value of the previously measured distance metrics or the average value multiplied by a predefined factor. According to a different example, the threshold corresponds to the distance metric measured directly before the current distance metric, optionally multiplied by a predefined factor (e.g., 1.1, 1.2, 1.5, or 2.0). According to this example, the current scanning vector of the group is compared to a previous scanning vector of the group and the result of the comparison is compared to a previous comparison between the previous scanning vector and the scanning vector before the previous scanning vector. In this way, it can be judged whether the set of data values of a current scanning vector are in a normal range for the respective group or not. In case the data values are significantly different, it is judged that a quality problem may occur at a location of the respective vector.

As an alternative to comparing each newly measured scanning vector to the previously recorded scanning vector of the same group, a combined set of data values derived from at least two second scanning vectors of the group may be generated. The set of data values of the newly measured scanning vector (first scanning vector) is then compared to this combined set. In other words, a distance metric is calculated between the combined set and the set of data values of the first scanning vector.

In case the distance metric is larger than a predefined threshold value, it is determined by the determining unit 42 that a quality measure of the work piece at a position of the first scanning vector is lower than at other positions of the work piece. The combined set of data values may be an averaged set of data values, according to an embodiment. More precisely, a form of averaging may have been applied to the sets of data values of the at least two of the second scanning vectors of the group in order to derive an averaged set of data values. In other words, the combined set of data values may represent an averaged vector, i.e., an averaged version of the data values of the vectors that are combined. The averaging may include deriving an arithmetic mean of the data values of the different vectors. The combined set of data values may have been derived by considering at least one of a meridian, extreme values, and quantiles.

The operation of the comparing unit 40 may also be described as follows. According to one or more embodiments, a comparison between absolute intensity progressions (drop/increase of intensity from vector to vector) is possible, as well as a relative comparison (e.g., differences/deviations/fluctuations with regard to each other). Together with the planning data, conclusions can be drawn regarding a resulting quality of the work piece (e.g., in conjunction with a location of the vector within the layer).

The comparison can be determined based on adequate arbitrary quality criteria or numerical metrics (e.g., correlation, absolute differences, extreme value analysis, etc.). The quality criteria may be multi-dimensionally structured, by additionally considering system parameters or information of the planning data. These connections can be brought into relation with each other via neural networks or a decision tree.

All quality data may be collected and stored for later use. This (growing) data base may be used for "learning", which work piece quality is to be expected for which scanning vector. These values may be used for reference values (or, more precisely, reference sets of data values) for different classes (i.e., different groups) of scanning vectors, for later scans. As an example, an algorithm may be implemented which "learns" based on (e.g., random) sample values, in order to reduce the amount of processed and stored data. As a reference, individual previous build processes may be used.

The determining unit 42 determines, based on the comparing of the comparing unit 40, a quality measure of the work piece 4 at a position of the first scanning vector. In case the comparing shows that the set of data values of the first scanning vector differs too much from the set of data values it is compared with (i.e., a threshold value is exceeded), the determining unit decides that the quality measure of the work piece at the position of the first scanning vector is reduced.

These positions of the "problematic" first scanning vectors may be saved and output to a user. In this way, the user may obtain information regarding potentially problematic regions of the work piece, i.e., regions where a quality of the work piece may have changed.

Additionally or alternatively, the control unit 8 of the apparatus 2 may initiate countermeasures in order to improve the quality of the irradiated scanning vectors. In other words, process parameters of the apparatus may be adapted during the build process, based on the determined quality measure. For example, irradiation parameters such as a focus position or a laser power may be adapted.

The operation of the determining unit 42 may also be described as follows. An example is the impact of deviations in the progression of the intensity signal. These deviations may correlate with a waviness of the corresponding outer contours, which may be understood as a classifier for a surface quality. In case of an excessively high laser power, bubbles as well as evaporation may occur, which again cause a strong waviness of the outer contour and, thus, a corresponding reduced quality of the work piece.

Further, in multi-optics systems, the chronological course of the different optics with regard to each other and the impact on the work piece quality can be understood.

For example, when two lasers irradiate adjacent regions at the same time or at similar times, a considerably increased intensity course is obtained.

A measure of similarity of the vector comparison can later be attributed to density measurements of the finished work piece, or to the crystalline structure, the tensile strength of the work piece, or a different quality feature.

Further, a multi-dimensional approach can be considered. The individual group (or class) intensities can be shown, in each layer, as 2D intensity image. These 2D images can be arranged for the different irradiation layers and can be viewed and evaluated as 3D data set. These 3D data sets can be analyzed over different build processes as N-dimensional data sets.

In this way, information of the chronological progression of multiple layers can be obtained, as well as dependencies, e.g., with regard to the work piece height or amount of powder in the build cylinder.

Figure 3:
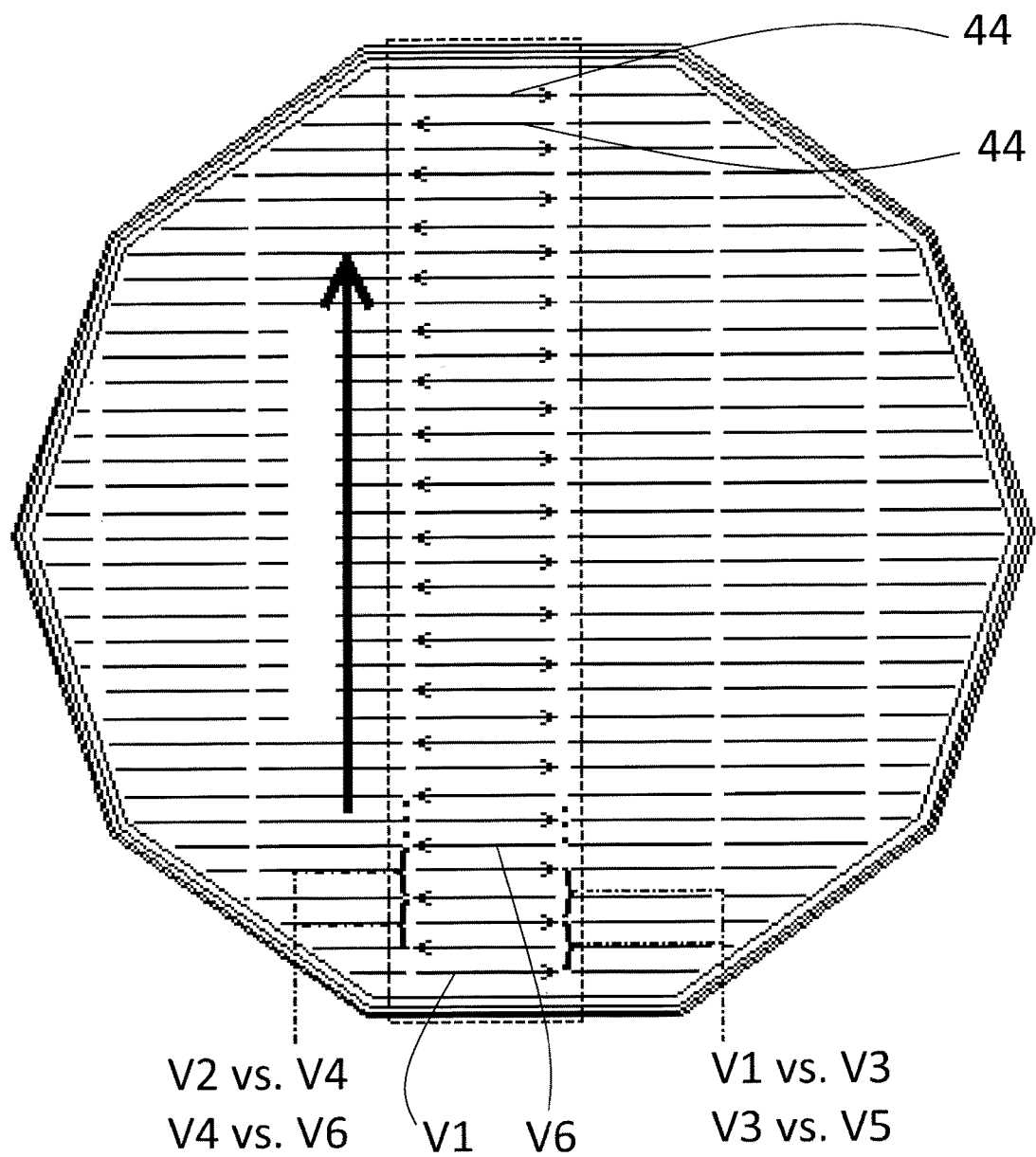
FIG. 3 shows a top view of an exemplary structure with scanning vectors that are compared to each other.
Figure 3:
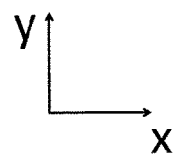

FIG. 3 shows an example of a layer of a work piece 4 forming a 10-sided polygon that is filled with a plurality of scanning vectors 44. In FIG. 3, for better clarity, only two exemplary scanning vectors are indicated with reference signs. More precisely, the inner part of the layer is filled with a plurality of scanning vectors 44 defining a pattern, according to which most of the scanning vectors 44 have a predefined fixed length and a scanning direction of the scanning vectors reverses after each scanning vector.

In the example shown in FIG. 3, a plurality of columns of scanning vectors is scanned, wherein the columns extend along the y-axis and the individual scanning vectors are parallel to the x-axis. In one exemplary column (the middle column shown in FIG. 3), a first scanning vector V1 is irradiated along the positive x-direction and, subsequently, a second scanning vector V2 is irradiated along the negative x-direction. After that, a third scanning vector V3 is scanned along the positive x-direction, and so on. In this way, the column is scanned along the positive y-direction, as indicated by the thick arrow in FIG. 3.

The scanning strategy described above is defined by the planning data for the three-dimensional work piece 4 to be produced. This planning data is analyzed in order to define different groups of scanning vectors fulfilling a particular similarity criterion. The example shown in FIG. 3, scanning vectors extending in the positive x-direction are associated with a first group and scanning vectors extending in the negative x-direction are associated with a second group.

Further, during irradiation of the scanning vectors 44 the sensor 6 measures an intensity of thermal radiation emitted by the melt pool, as discussed above. The generated data values are associated to corresponding vector data of the scanning vectors.

As shown in FIG. 3, a pairwise comparison between the respective sets of data values of the scanning vectors is carried out. When the third scanning vector V3 has been scanned, the corresponding set of data values is compared to the set of data values assigned to the first scanning vector V1. Similarly, V4 is compared to V2, V5 is compared to V3, V6 is compared to V4, and so on.

Thus, the set of data values of a particular scanning vector is always compared to the set of data values of a scanning vector of the same group. Data values of similar scanning vectors can be compared to each other. Hence, a result of the comparison should show that the data values are similar, in case no quality problem exists with regard to the respective scanning vector.

Figure 4:
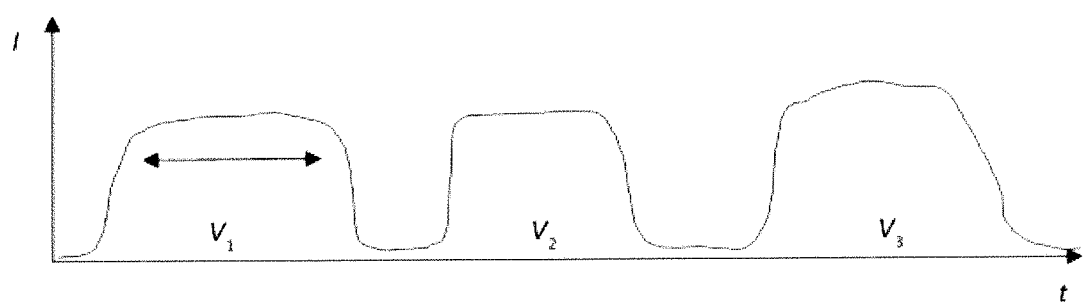
FIG. 4 shows a diagram of two scanning vectors that are compared to each other.

FIG. 4 shows an example of data values of different scanning vectors $V_1$ to $V_3$ that can be compared to each other. Since a timestamp has been assigned to the individual data values, the data values can be plotted on a (horizontal) time axis. The vertical axis indicates the corresponding data values, i.e., intensity values of thermal radiation intensity emitted by the melt pool (arbitrary units).

Based on the representation of FIG. 4, it is clear that the data values of the vectors can be easily compared to each other according to one of the techniques described above (e.g., by comparing extreme values).

Further, the double-sided arrow in FIG. 4 indicates that, according to an embodiment, only a subset of the set of data values of each of the scanning vectors can be compared to each other (instead of all data values). In this case, a subset having a fixed duration is defined and only the data values of a corresponding section of each scanning vector are compared to each other. In this way, it is possible to choose a region of the scanning vectors, which is free of artificially wrong data values. Further, choosing a subset may be necessary in case the scanning vectors that shall be compared to each other have different lengths, such that subsets with a same length can be compared to each other (or a subset of one of the vectors is compared to the entire other vector having the same length as the subset).

It should further be generally noted that the two or more scanning vectors (i.e., their respective sets of data values) that are compared to each other are not necessarily scanning vectors extending in the same direction. The similarity criterion may also group vectors that extend into opposite directions ore different directions, in general. In the example of FIG. 4, the two scanning vectors V1 and V2 (or respective subsets) may be compared to each other, even though the two scanning vectors may have been scanned into opposite directions (in case a meandering scanning strategy).

Figure 5:
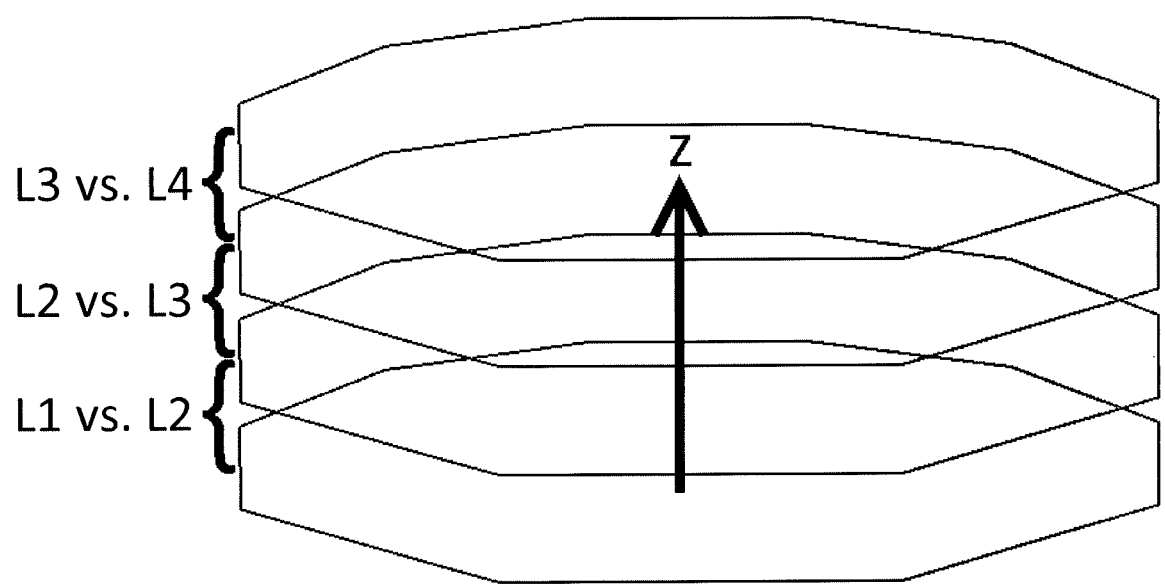
FIG. 5 shows a schematic representation of multiple layers, wherein scanning vectors of different layers are compared to each other.

FIG. 5 shows that also scanning vectors of different layers (L1 to L4) can be compared to each other. The figure shows a plurality of layers arranged on top of each other, wherein a cross-section of each layer, as an example, is again the 10-sided polygon shown in FIG. 3. According to the embodiment shown in FIG. 5, scanning vectors that are part of a contour of the work piece are arranged into one group. Further, the measured data values of a scanning vector is compared to data values of a scanning vector of a different (e.g., adjacent) layer. As shown in FIG. 5, a scanning vector of a contour of L1 is compared to a scanning vector of a contour of L2. Similarly, a scanning vector of a contour of L2 is compared to a scanning vector of a contour of L3, and so on. A comparison of scanning vectors between different layers can also be carried out for scanning vectors that are not part of a contour of the work piece (i.e., vectors of an inner part of the work piece). In addition, scanning vectors may be compared with scanning vectors of previous build processes (e.g., with regard to series production of identical build instructions).

In the above description, embodiments have been described, which provide an improved technique for analyzing sensor data of a sensor arranged in an apparatus for producing a three-dimensional work piece via irradiation of layers of raw material with an energy beam.

The invention claimed is:

1. A device for analyzing sensor data of a sensor arranged in an apparatus for producing a three-dimensional work piece via irradiation of layers of raw material with an energy beam, the device comprising a control unit configured to:

receive the sensor data as a time series of data values, wherein each data value is indicative of a process condition within the apparatus during producing the three-dimensional work piece;

receive planning data for the three-dimensional work piece, the planning data defining a plurality of scanning vectors and a sequence according to which the energy beam is scanned along the scanning vectors;

associate the data values of the time series to corresponding vector data of the scanning vectors of the planning data to form a plurality of sets of data values for corresponding scanning vectors;

define, based on the planning data, a group of at least two scanning vectors among the plurality of scanning vectors, wherein the scanning vectors of the group meet a predefined similarity criterion, wherein the similarity criterion considers a similarity in orientation of the scanning vectors;

compare a set of data values of a first scanning vector of the group to a set of data values of at least one second scanning vector of the group or to a combined set of data values derived from at least two second scanning vectors of the group;

and determine, based on the comparing, a quality measure of the work piece at a position of the first scanning vector, wherein the control unit is further configured to adapt, during a build process of the work piece, a process parameter of the apparatus, based on the determined quality measure.

2. The device of claim 1, wherein the data values are intensity values or temperature values of thermal radiation generated in a melt pool where the energy beam impinges on the raw material.

3. The device of claim 1, wherein the device is configured to carry out at least the steps of receiving the sensor data, associating, comparing, and determining during the build process of the work piece.

4. The device of claim 1, wherein the control unit is further configured to associate time data with the data values of the time series.

5. The device of claim 1, wherein the similarity criterion considers at least one of a similarity in length of the scanning vectors and whether a scanning vector is part of a contour of the work piece.

6. The device of claim 1, wherein the control unit is further configured to compare the set of data values of the first scanning vector of the group to a predefined reference set of data values associated to the group.

7. The device of claim 1, wherein the control unit is further configured to:
compare the at least one difference value to a stored difference value indicative of a difference between the sets of data values of two previously irradiated scanning vectors.

8. The device of claim 1, wherein the control unit is configured to perform the step of comparing by considering at least one of:
a course of absolute data values, such as decrease and/or increase of the data values from scanning vector to scanning vector;
a relative comparison of data values, such as differences, deviations, and/or fluctuations with regard to each other;
correlations of the set of data values of the first scanning vector and the set of data values of the at least one second scanning vector or the combined set of data values derived from the at least two second scanning vectors;
absolute differences between data values of the first scanning vector and data values of the at least one second scanning vector or the combined set of data values derived from the at least two second scanning vectors; and
an extreme value analysis of extreme values of the set of data values of the first scanning vector and of the set of data values of the at least one second scanning vector or of the combined set of data values derived from the at least two second scanning vectors.

9. The device of claim 1, wherein the control unit is configured to perform the step of comparing by considering only a subset of the set of data values of the first scanning vector and/or of the at least one second scanning vector or of the combined set of data values derived from the at least two second scanning vectors.

10. The device of claim 1, wherein the control unit is configured to output a data set that represents at least one two-dimensional image of a layer of the work piece, wherein the data values of the time series are assigned to corresponding pixels of the two-dimensional image.

11. An apparatus for producing a three-dimensional work piece via irradiation of layers of raw material with an energy beam, the apparatus comprising:
the device of claim 1;
an energy beam source for producing the energy beam and irradiating the energy beam onto the layers of raw material; and
a sensor configured to measure the time series of data values and to transmit the time series of data values to the device.

12. The device of claim 1, wherein the control unit is configured to:
compare the set of data values of the first scanning vector of the group to the set of data values of a previously irradiated second scanning vector of the group; and
determine, based on the comparing, at least one difference value indicative of a difference between the sets of data values of the first scanning vector and the previously irradiated second scanning vector.

13. A method for analyzing sensor data of a sensor arranged in an apparatus for producing a three-dimensional work piece via irradiation of layers of raw material with an energy beam, the method comprising:
receiving, by a control unit, the sensor data as a time series of data values, wherein each data value is indicative of a process condition within the apparatus during producing the three-dimensional work piece;
receiving, by the control unit, planning data for the three-dimensional work piece, the planning data defining a plurality of scanning vectors and a sequence according to which the energy beam is scanned along the scanning vectors;
associating, by the control unit, the data values of the time series to corresponding vector data of the scanning vectors of the planning data to form a plurality of sets of data values for corresponding scanning vectors;
defining, by the control unit and based on the planning data, a group of at least two scanning vectors among the plurality of scanning vectors, wherein the scanning vectors of the group meet a predefined similarity criterion, wherein the similarity criterion considers a similarity in orientation of the scanning vectors;
comparing a set of data values of a first scanning vector of the group to a set of data values of at least one second scanning vector of the group or to a combined set of data values derived from at least two second scanning vectors of the group;
determining, by the control unit and based on the comparing, a quality measure of the work piece at a position of the first scanning vector; and
adapting, by the control unit during a build process of the work piece, a process parameter of the apparatus, based on the determined quality measure.

14. A computer program product stored on a non-transitory computer-readable storage medium, comprising computer-readable instructions for causing a computer to carry out the method according to claim 13.

* * * * *